(12) United States Patent
Sigalas

(10) Patent No.: US 6,735,235 B2
(45) Date of Patent: May 11, 2004

(54) THREE-DIMENSIONAL PHOTONIC CRYSTAL ADD-DROP FILTER

(75) Inventor: Mihail Sigalas, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 57 days.

(21) Appl. No.: 10/143,233

(22) Filed: May 10, 2002

(65) Prior Publication Data

US 2003/0210857 A1 Nov. 13, 2003

(51) Int. Cl.[7] .............................................. H01S 3/082
(52) U.S. Cl. ............................ 372/97; 372/92; 372/39; 372/43
(58) Field of Search ............................. 372/97, 92, 39, 372/28.022, 43

(56) References Cited

U.S. PATENT DOCUMENTS

| | | | | |
|---|---|---|---|---|
| 5,187,461 A | * | 2/1993 | Brommer et al. | 33/219.1 |
| 5,335,240 A | * | 8/1994 | Ho et al. | 372/39 |
| 5,406,573 A | | 4/1995 | Ozbay et al. | |
| 6,130,969 A | | 10/2000 | Villeneuve et al. | |
| 2002/0126721 A1 | * | 9/2002 | Kito et al. | 372/45 |

OTHER PUBLICATIONS

K. M. Ho et al.; "Photonic Band Gaps In Three Dimensions: New Layer–By–Layer Perioduc Structures"; Solid State Communication, vol. 89, No. 5; 1994; pp. 413–416.

Brent E. Little; "Toward Very Large–Scale Integrated Photonics"; Optics & Photonics News; Nov. 2000; pp. 24–28.

* cited by examiner

*Primary Examiner*—Paul Ip
*Assistant Examiner*—Leith A Al-Nazer

(57) ABSTRACT

A three-dimensional photonic crystal add-drop filter apparatus has a three-dimensional photonic crystal, a first waveguide for transmitting light having a frequency within a bandgap of the three-dimensional photonic crystal, and a second waveguide. A resonant cavity couples the light in the first waveguide to the second waveguide for extracting at least one wavelength of the light transmitted in the first waveguide and redirecting the extracted light to the second waveguide. The apparatus has a full three-dimensional bandgap and thus does not require total internal reflection to confine the light as is required in a two-dimensional photonic crystal slab. The waveguides can be made single mode such that only one polarization is allowed to propagate thus avoiding mixing of the two polarizations.

19 Claims, 4 Drawing Sheets

THREE-DIMENSIONAL PHOTONIC CRYSTAL ADD-DROP FILTER

BACKGROUND OF THE INVENTION

1. Technical Field of the Invention

The present invention relates generally to the field of photonic crystals; and, more particularly, to a three-dimensional photonic crystal add-drop filter.

2. Description of Related Art

Photonic crystals (PC) are periodic dielectric structures that can prohibit the propagation of light in certain frequency ranges (see J. D. Joannopoulos, R. D. Meade and J. N. Winn, *Photonic Crystals*, Princeton University Press, Princeton, N.J., 1995). More particularly, photonic crystals are structures that have spatially periodic variations in refractive index; and with a sufficiently high refractive index contrast, photonic bandgaps can be opened in the structure's optical transmission characteristics. The term "photonic bandgap" as used herein and as is commonly used in the art is a frequency range in which propagation of light through the photonic crystal is prevented. In addition, the term "light" as used herein is intended to include radiation throughout the electromagnetic spectrum, and is not limited to visible light.

Two-dimensional photonic crystal slabs are known that comprise a two-dimensional periodic lattice incorporated within a slab body. In a two-dimensional photonic crystal slab, light propagating in the slab is confined in the direction perpendicular to the faces of the slab via total internal reflection. Light propagating in the slab in directions other than perpendicular to the slab faces, however, is controlled by the spatially periodic structure of the slab. In particular, the spatially periodic structure causes a photonic bandgap to be opened in the transmission characteristics of the structure within which the propagation of light through the slab is prevented. Specifically, light propagating in a two-dimensional photonic crystal slab in directions other than perpendicular to a slab face and having a frequency within a bandgap of the slab will not propagate through the slab; while light having frequencies outside the bandgap is transmitted through the slab unhindered.

It is known that the introduction of defects in the periodic lattice of a photonic crystal allows the existence of localized electromagnetic states that are trapped at the defect site, and that have resonant frequencies within the bandgap of the surrounding photonic crystal material. By arranging these defects in an appropriate manner, a waveguide can be created in the photonic crystal through which light having frequencies within the bandgap of the photonic crystal (and that would normally be prevented from propagating through the photonic crystal) is transmitted through the photonic crystal.

Three-dimensional photonic crystals that have spatial periodicity in three dimensions, and that can prevent the propagation of light having a frequency within the crystal's bandgap in all directions, are also known. For example, a known three-dimensional photonic crystal apparatus comprising dielectric elements stacked layer by layer is illustrated in FIG. 1 (also see U.S. Pat. Nos. 5,335,240 and 5,406,573 and K. M. Ho, et al., "Solid State Commun.", 89, 413, 1994).

The three-dimensional photonic crystal apparatus illustrated in FIG. 1 is generally designated by reference number 10 and comprises a plurality of layers of elements arranged one on top of another. In FIG. 1, three-dimensional photonic crystal apparatus 10 comprises twelve layers 12-1 to 12-12; however, twelve layers is intended to be exemplary only as the apparatus can comprise any desired plurality of layers.

Each layer 12-1 to 12-12 comprises a plurality of elements arranged to be parallel to and equally spaced from one another. In addition, the plurality of elements in each layer are arranged perpendicular to the elements in an adjacent layer.

In FIG. 1, the elements comprise rods, and layers 12-1, 12-3, 12-5, 12-7, 12-9 and 12-11 each comprise a plurality of rods 14 arranged in a direction parallel to the x-axis of the apparatus (as shown in FIG. 1); and layers 12-2, 12-4, 12-6, 12-8, 12-10 and 12-12 each comprise a plurality of rods 16 arranged in a direction parallel to the y-axis of the apparatus. In addition, as shown in FIG. 1, in every other layer, the rods are laterally displaced with respect to one another by an amount equal to one-half the spacing between the rods in a layer. Specifically, in FIG. 1, the rods in layers 12-3, 12-7 and 12-11 are aligned with respect to one another along the y-axis, but are laterally displaced, along the y-axis, from the plurality of rods in layers 12-1, 12-5 and 12-9. Also, the rods in layers 12-2, 12-6 and 12-10 are aligned with respect to one another along the x-axis, but are laterally displaced, along the x-axis, from the plurality of rods in layers 12-4, 12-8 and 12-12.

The three-dimensional photonic crystal apparatus 10 of FIG. 1, can be described as comprising a photonic crystal having a three-dimensional array of unit cells therein in which a "unit cell" is defined as a cell having dimensions in the x and y directions equal to the spacing between the rods in the layers, i.e., the dimensions 41 and 42 in FIG. 1; and a dimension in the z-direction equal to the thickness of four layers, i.e., the dimension 44 in FIG. 1.

In the three-dimensional photonic crystal apparatus illustrated in FIG. 1, rods 14 and 16 comprise dielectric rods of a material having a high dielectric constant, e.g., alumina, surrounded by a material having a low dielectric constant, e.g., air.

Wave division multiplexing is a process that permits the transmission capacity of an optical communications system to be increased. In particular, in a wave division multiplexer (WDM) system, information is transmitted using a plurality of optical carrier signals, each carrier signal having a different optical wavelength. By modulating each carrier signal with a different one of a plurality of information signals, the plurality of information signals can be simultaneously transmitted through a single waveguiding device such as a single optical fiber.

For a WDM system to function properly, the system must have the capability of extracting a carrier signal at a certain wavelength from one waveguide and adding the signal at that wavelength to another waveguide so as to redirect the path through which the extracted carrier signal travels.

FIG. 2 is a block diagram that schematically illustrates components of a WDM communications system. The system is generally designated by reference number 20, and includes a signal source 22 that transmits a plurality of carrier signals at different optical wavelengths through an optical fiber or other waveguiding device 24. The optical fiber 24 is connected to an extraction device 26 that is capable of extracting one or more of the carrier signals carried by the optical fiber 24 and redirecting the extracted signal or signals to another optical fiber or waveguiding device 28. The remaining carrier signals carried by the optical fiber 24 are transmitted through the extraction device 26 to an optical fiber 30 or the like. The carrier signals carried by optical fibers 28 and 30 are then further processed by processing structure not illustrated in FIG. 2.

Add-drop filters are commonly used in optical communications circuits to extract light of a particular wavelength from one waveguide and direct the extracted light to another waveguide. In effect, an add-drop filter allows light of one wavelength to be dropped from one path in an optical communications circuit and added to another path in the circuit.

Known add-drop filters, however, are not fully satisfactory for use as an extraction device in a WDM system. For example, in one known configuration, light propagates through conventional high dielectric waveguides and the cavities between the waveguides-are micro-rings (see B. E. Little and S. T. Chu, *Toward very large-scale integrated photonics*, Optics and Photonics News, page 24, November 2000). Since the propagation is through the high dielectric material, however, internal losses and dispersion of the material may critically affect the results. The results will be even more critically affected as the power of the light waves increase in future WDM systems.

In U.S. Pat. No. 6,130,969, configurations are described in which waveguides and cavities are created in two-dimensional photonic crystals having what may be considered as infinitely long dielectric rods. These configurations, however, are difficult to fabricate with dimensions commensurate with optical communications wavelengths. In two-dimensional photonic crystals having finite length dielectric rods, there is a problem with the confinement of the light along the axes of the rods. Also, the photonic bandgap appears only in one polarization; and, as a result, the configurations are inherently multimode.

There is, accordingly, a need for an extraction device for use in WDM communications systems and for other applications that is capable of extracting and redirecting one or more wavelengths from an optical signal that includes a plurality of wavelengths, that can be made single mode so as to avoid mixing of two polarizations and in which internal losses and dispersion of high refractive index materials used in the extraction device are not so important.

SUMMARY OF THE INVENTION

The present invention provides a three-dimensional photonic crystal add-drop filter apparatus that is capable of extracting and redirecting one or more wavelengths from an optical signal that includes a plurality of wavelengths.

A three-dimensional photonic crystal add-drop filter apparatus according to the present invention comprises a three-dimensional photonic crystal having a first waveguide for transmitting light having a frequency within a bandgap of the three-dimensional photonic crystal, and a second waveguide. A resonant cavity couples light from the first waveguide to the second waveguide for extracting at least one wavelength of the light transmitted in the first waveguide and redirecting the extracted light to the second waveguide.

The resonant cavity modifies the transmission characteristics of the first waveguide by creating one or more transmission zeros that comprise narrow frequency ranges within the bandgap of the photonic crystal at which light that is otherwise capable of being transmitted through the first waveguide is prevented from propagating through the first waveguide, i.e., is "filtered" out of the first waveguide. By coupling light from the first waveguide to the second waveguide through the resonant cavity, the light that is prevented from propagating through the first waveguide is redirected to the second waveguide. As a result, a three-dimensional photonic crystal add-drop filter apparatus is provided that is capable of removing light of one or more wavelengths from the first waveguide and redirecting the removed light to the second waveguide.

According to an embodiment of the invention, the three-dimensional photonic crystal comprises a plurality of layers arranged one above another. Each of the plurality of layers comprises a plurality of elements that are parallel to and spaced from one another, and the plurality of elements in each layer are arranged at an angle greater than zero degrees with respect to the plurality of elements in an adjacent layer. The first waveguide comprises a first region of defects in an element in a layer of the plurality of layers and having a light input and a light output, and the second waveguide comprises a second region of defects in a portion of an element in a layer of the plurality of layers and having a light output. The resonant cavity comprises a third region of defects in one or more layers to couple the first and second regions of defects.

According to another embodiment of the present invention, the first and second waveguides are in different layers of the plurality of layers such that the light extracted from the first waveguide and redirected to the second waveguide exits the second waveguide in a different x-y plane than the light in the first waveguide. This capability of redirecting light from one layer of the three-dimensional photonic crystal apparatus to another layer of the apparatus provides a designer with substantial flexibility when the apparatus is incorporated in an optical circuit.

According to another embodiment of the invention, the plurality of elements in each layer comprise a plurality of dielectric rods, such as alumina rods, and the plurality of dielectric rods in one layer are arranged perpendicular to the plurality of rods in adjacent layers; and, in addition, the plurality of rods in every other layer are laterally displaced with respect to one another.

A three-dimensional photonic crystal apparatus according to embodiments of the present invention provides a fully three-dimensional photonic bandgap. Accordingly, total internal reflection is not needed to confine the light. Instead, the light is confined in the low dielectric region of the photonic crystal (e.g., in air) such that the effects of internal losses and dispersion of the high refractive index medium (i.e., the elements) are not so important. In addition, the waveguides can be made single mode such that only one polarization is allowed to propagate and there is no mixing of the two polarizations.

A three-dimensional photonic crystal add-drop filter apparatus according to the present invention can be designed to precisely control the wavelength of light extracted from an optical signal. The apparatus is, accordingly, particularly suitable for use as an extraction device in WDM communications systems and in other applications that require the extraction of one or more wavelengths of light from a signal that includes a plurality of wavelengths.

Yet further advantages, specific details and other embodiments of the present invention will become apparent hereinafter in conjunction with the following detailed description of exemplary embodiments of the invention.

DETAILED DESCRIPTION OF THE EXEMPLARY EMBODIMENTS OF THE INVENTION

Figure 3:
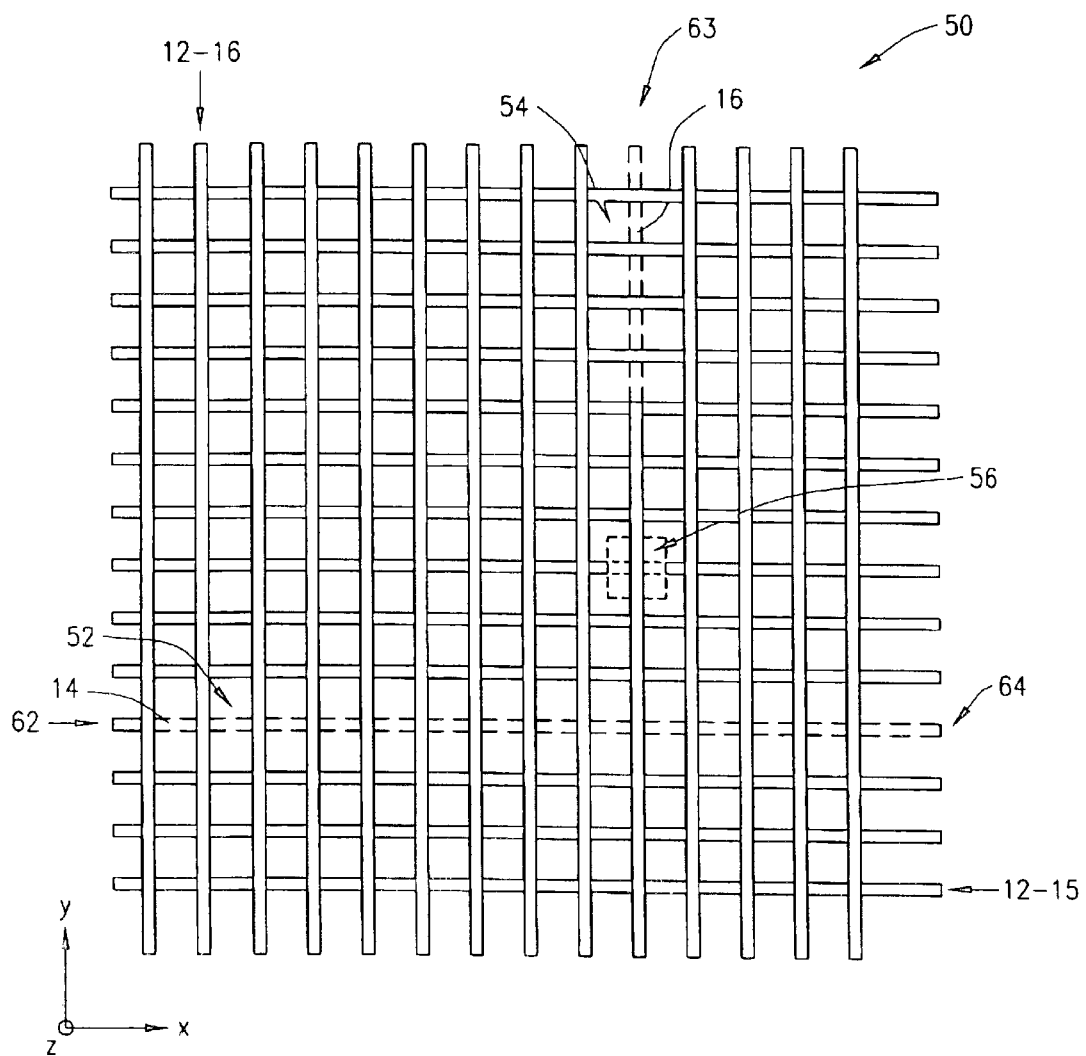
FIG. 3 is a projection view, in the xy plane, of the fifteenth and sixteenth layers of a three-dimensional photonic crystal add-drop filter apparatus according to an embodiment of the present invention.

FIG. 3 is a projection view, in the xy plane, of a portion of two adjacent layers of a three-dimensional photonic crystal add-drop filter apparatus 50 according to an embodiment of the present invention. In the following description, it is assumed that the two adjacent layers comprise the fifteenth and sixteenth layers of the apparatus. It should be understood, however, that this is intended to be exemplary only as the layers can comprise any two adjacent layers of the apparatus. Apparatus 50 is similar to the three-dimensional photonic crystal apparatus 10 of FIG. 1, although it includes a larger number of layers, for example, sixteen layers or more. Apparatus 50 includes a first region of defects therein to define a first waveguide 52, and a second region of defects to define a second waveguide 54. More particularly, first waveguide 52 comprises a first region of defects created by omitting one complete element 14 in the fifteenth layer 12-15; and second waveguide 54 comprises a second region of defects created by omitting a portion of an element 16 in the sixteenth layer 12-16 of apparatus 50 (the omitted element and the omitted portion are shown in dotted line in FIG. 3). In other embodiments, the first and second waveguides can be created by replacing all or a part of an element with a wider or a narrower element.

A resonant cavity 56 is also created in the three-dimensional photonic crystal apparatus 50 by omitting a small portion of an element 14 (also shown in dotted line) in the fifteenth layer 12-15. The removal of the small portion of the element creates a square-shaped air cavity one unit cell wide.

In effect, the resonant cavity 56 couples light from the first waveguide to the second waveguide through the resonant cavity 56. The resonant cavity can also be created by replacing the small omitted portion of the element with an element portion of different size.

The three-dimensional photonic crystal apparatus 50 having the first and second waveguides and the resonant cavity coupling the first and second waveguides functions as an add-drop filter when a light signal comprised of a plurality of wavelengths of light is transmitted through the first waveguide. In particular, if an input light signal comprised of a plurality of wavelengths is directed into the first waveguide 52 at input port 62, one or more of the wavelengths will be extracted from the input light signal and redirected to the second waveguide 54. The remainder of the input light signal will continue to be transmitted through the first waveguide 52 and will exit the first waveguide at output port 64. In effect, the resonant cavity functions to modify the transmission characteristics of the first waveguide by creating transmission zeros within the bandgap of the photonic crystal at which light that is otherwise capable of propagating through the first waveguide is prevented from propagating through the first waveguide. The frequency of the transmission zero corresponds to the resonant frequency of the resonant cavity. The one or more wavelengths of light that are prevented from passing through the first waveguide are redirected to the second waveguide and exit the second waveguide at output port 63.

The wavelength of the light that is extracted from the first waveguide is a function of the configuration of the resonant cavity. Accordingly, as will be discussed more fully hereinafter, by appropriately designing the resonant cavity, a distinct selected wavelength or a set of wavelengths can be extracted from the first waveguide and redirected to the second waveguide.

Figure 1:
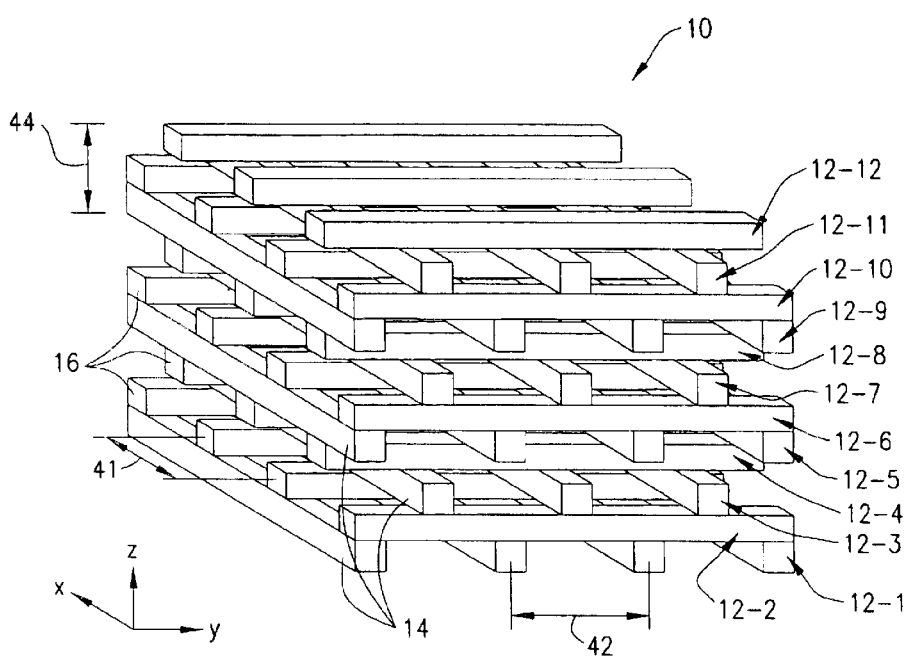
FIG. 1 is a schematic, perspective view illustrating a three-dimensional photonic crystal apparatus that is known in the prior art.

The operation of a three-dimensional photonic crystal add-drop filter apparatus of the present invention was demonstrated in a system based on the microwave region. The three-dimensional photonic crystal add-drop filter apparatus was constructed as illustrated in FIG. 3. The constructed apparatus comprised a photonic crystal consisting of alumina rods having a dielectric constant of 9.61 stacked together as shown in FIG. 1 with the rods in each layer perpendicular to the rods in adjacent layers. The separation between rods within the layers (x or y axis) was 11 mm. The rods had a square cross-section with a width of 3.2 mm and they were 15 cm long. The photonic crystal apparatus was constructed to have 14×14 × 7 unit cells with each unit cell being 11×11×12.8 mm.

In the above-described design, there was a full bandgap between 11.2 and 12.9 GHz. Any other combination of parameters, i.e., the lattice constant (the spacing between the rods), number of unit cells, the dielectric constant and width of the dielectric rods, can give similar results provided that a full photonic bandgap exists. As is well-known to those skilled in the art, the above-described characteristics in the microwave regime can readily be extended to the optical regime by appropriate scaling of the lattice constant. By decreasing the lattice constant, the corresponding operating wavelength of the structure will decrease linearly. Accordingly, the structure can be directly scaled down to the 200 THz region at which optical communications systems such as WDM systems operate.

Waveguides and resonant cavities can be created by omitting all or a part of a rod as indicated above. For the particular WDM configuration studied, a complete rod was omitted from layer 12-15 and a part of a rod was omitted from layer 12-16 as shown in FIG. 3. The resonant cavity 56 was created by removing part of a rod from layer 12-15 to define an air cavity and was one unit cell wide.

Transmission through the apparatus was measured using an Agilent 8509A network analyzer and two microwave horn antennas. The antennas were placed close to the input port 62 and the output ports 63 or 64 of the waveguides in order to maximize the coupling efficiency to the waveguide.

Figure 4A:
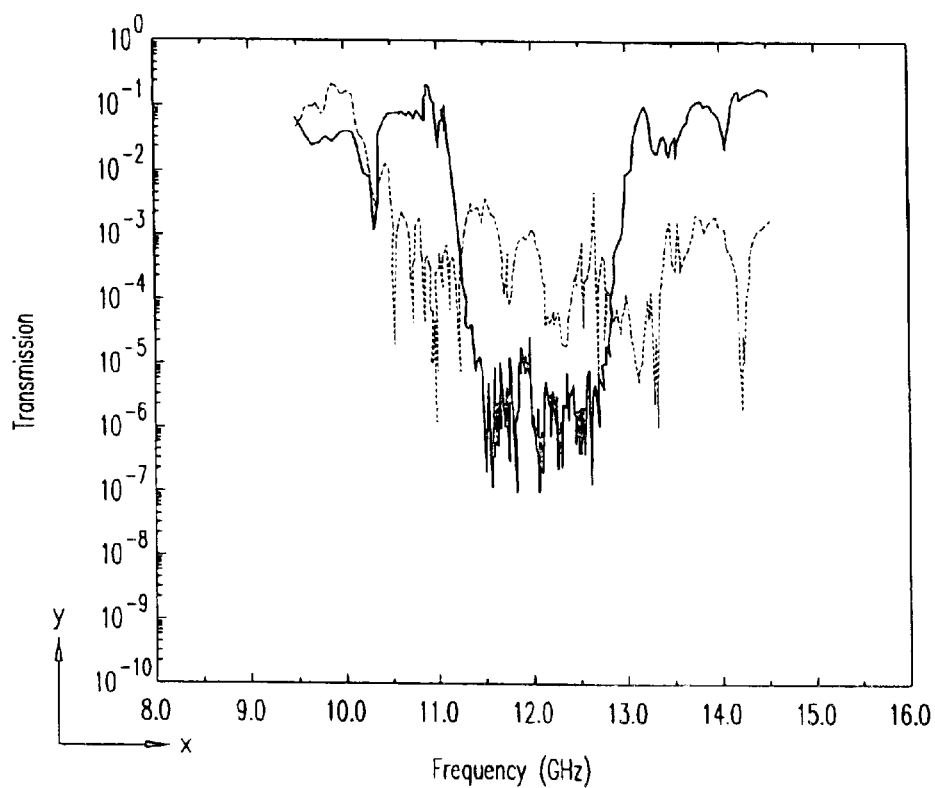
FIGS. 4A–4C are graphs that illustrate the transmission measured at different ports for different polarizations as a function of frequency in a simulation using a three-dimensional photonic crystal add-drop filter apparatus such as illustrated in FIG. 3.
Figure 4B:
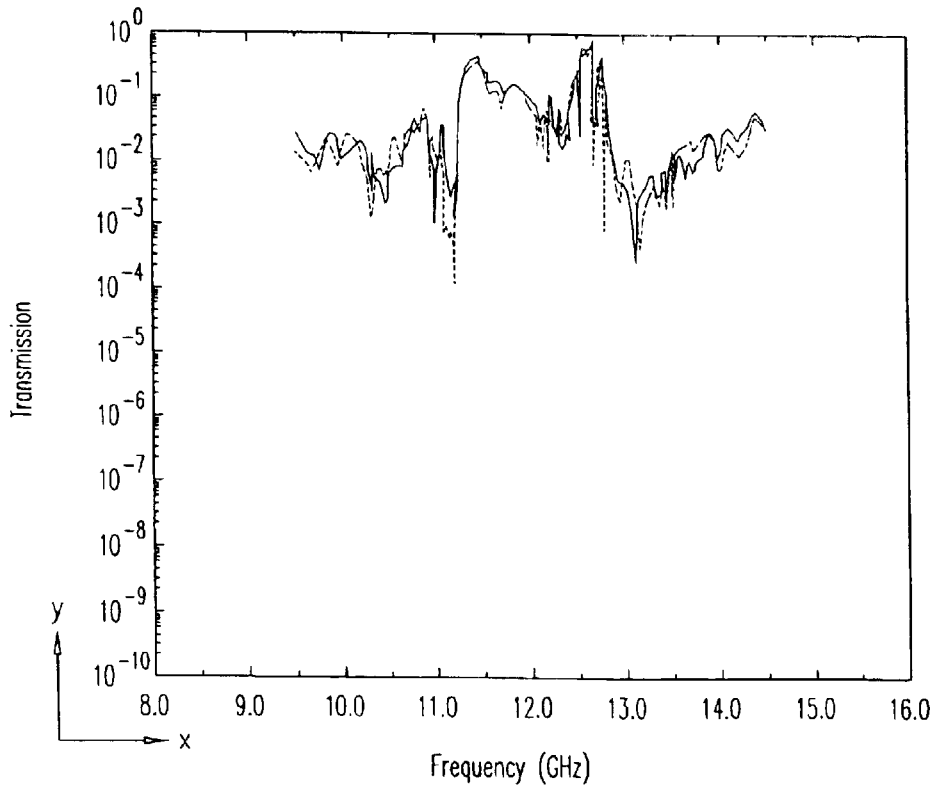
Figure 4C:
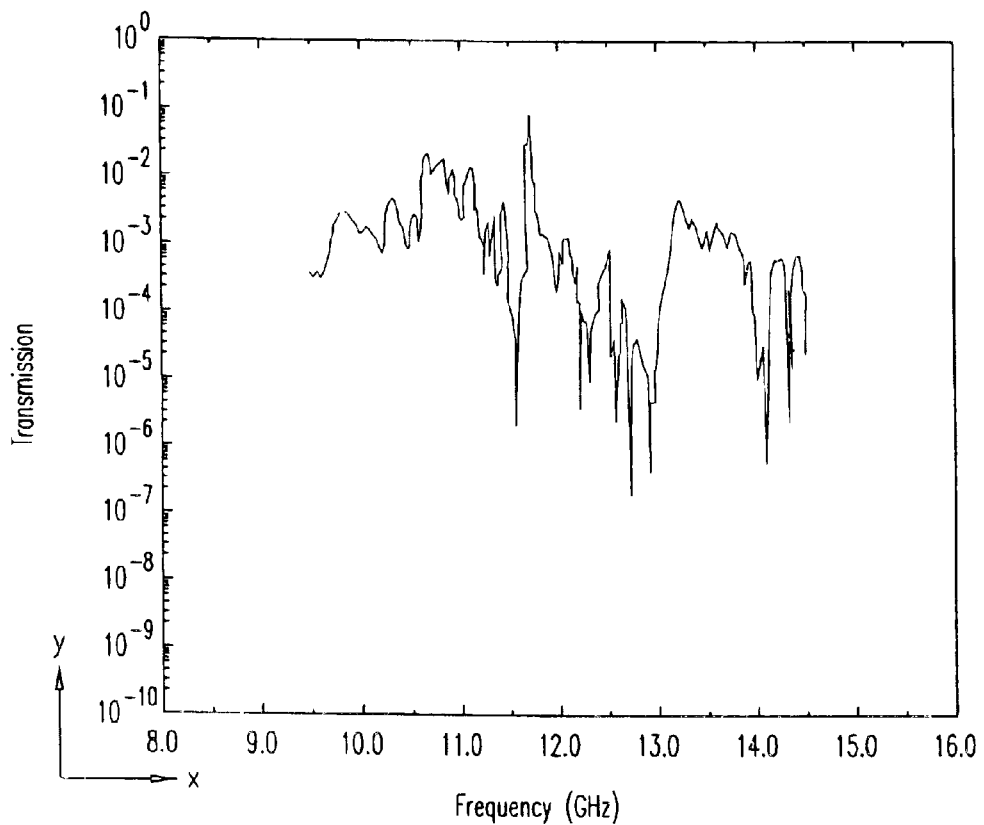

FIGS. 4A–4C are graphs that illustrate the transmission measured at different ports for different polarizations as a function of frequency in a simulation of the three-dimensional photonic crystal add-drop filter apparatus of FIG. 3. For the periodic case, i.e., for the three-dimensional photonic crystal without waveguides therein (the solid line in FIG. 4A) there was a gap between 11.2 and 13.1 GHz for waves propagating along the x-axis with the electric field along the z-axis. The transmission dropped by four orders of magnitude within most of the bandgap region. By removing one rod in the fifteenth layer, a waveguide band appeared between 11.3 and 12.7 GHz covering most of the photonic bandgap region (the solid line in FIG. 4B). The sharp notches and peaks above 12 GHz are due to imperfections in the structure (the rods were stuck together using glue and their alignment was not perfect).

The transmission at port 64 (the dotted line in FIG. 4B) showed a sharp notch at 11.694 GHz with Q-factor of 418 and transmission at the minimum 0.042. The transmission at port 63 (FIG. 4C) showed a sharp peak at 11.694 GHz with Q-factor of 466 and transmission at the maximum 0.84. Note that the transmission for the waveguide case (the solid line in FIG. 4B) is 0.123 at 11.694 GHz. Accordingly, in the configuration shown in FIG. 3, 68% of the power went to output port 63 and 32% of the power went to ouput port 64 at 11.694 GHz, while for all other frequencies within the waveguide band, 100% of the power went to output port 64.

The above-described simulation was for E-fields parallel to the z-axis. For E-fields parallel to the y-axis (the dotted line in FIG. 4A), the transmission was at least two orders of magnitude smaller indicating that this was a single-mode device and that there are no problems regarding the coupling between the two polarizations.

By changing the size of the resonant cavity, e.g., by extending the resonant cavity between one or more layers by omitting portions of rods in one or more layers; the resonant frequency of the apparatus can be changed. Also, the resonant cavity can be created by removing part of a rod that is parallel to the y-axis rather than the x-axis as shown in FIG. 3.

Since there is a fully three-dimensional photonic bandgap in the three-dimensional photonic crystal add-drop filter apparatus of the present invention, total internal reflection is not needed to confine the light, as would be the case with a two-dimensional photonic crystal slab apparatus. The light is confined in the low dielectric region (the air) so that the effects of internal losses and dispersion of the high refractive index medium are not so important. This also cannot be achieved using a two-dimensional photonic crystal slab.

The waveguides can also be made single mode. Only one polarization will be allowed to propagate, so there is no mixing of the two polarizations. This capability is also not possible in a two-dimensional photonic crystal slab apparatus.

In the three-dimensional photonic crystal add-drop filter apparatus described herein, the first and second waveguides are perpendicular to one another. In other embodiments of the invention, the first and second waveguide could be oriented to be at another angle greater than zero degrees with respect to one another or parallel to one another. Also, the waveguides are in different layers, i.e., in layers 12-15 and 12-16. The waveguides and the resonant cavity could also be located in different layers than illustrated in FIG. 3. For example, the resonant cavity could be in the nineteenth layer and the second waveguide could be in the twenty-fourth layer. The capability of orienting the waveguides to be perpendicular to one another and to be in different planes provides increased flexibility over planar waveguide geometries. These features also make it possible to assemble a plurality of add-drop filters either in the same plane or in different planes. This can be accomplished using the same or a plurality of different apparatus.

Figure 2:
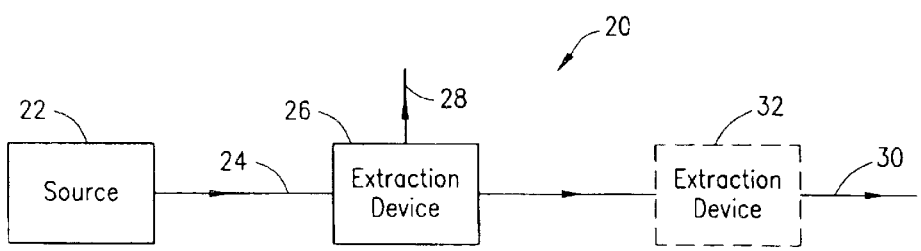
FIG. 2 is a block diagram that schematically illustrates components of a WDM communications system.

For example, FIG. 2 illustrates, in dotted line, a second extraction device 32 in the WDM communications system 20. When a plurality of extraction devices are used, each can be designed to extract a particular wavelength or set of wavelengths from the signal in optical fiber 24.

Figure 5:
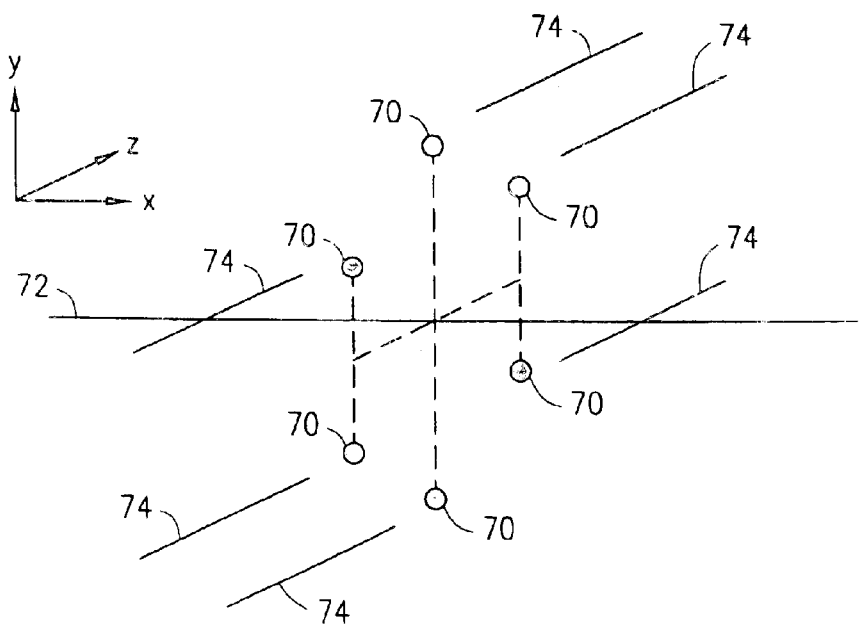
FIG. 5 is a simplified diagram of a multi-cavity WDM configuration utilizing a three-dimensional photonic crystal add-drop filter apparatus such as illustrated in FIG. 3.

When the same three-dimensional photonic crystal add-drop filter apparatus is used to extract particular wavelengths or sets of wavelengths from an optical signal, the apparatus can be configured, for example, as schematically illustrated in FIG. 5. In FIG. 5, a plurality of resonant cavities 70 are positioned in the same y-z plane around the main waveguide 72 that extends parallel to the x-axis from input port 0 to output port 1 (and that corresponds the first waveguide 52 in FIG. 3). The waveguides 74 are parallel to the y-axis and add-drop different wavelengths at ports 2–7 (and thus each correspond to the second waveguide 54 in FIG. 3). The dotted lines in FIG. 5 are used as guides to the eye in order to more clearly indicate that the resonant cavities 70 lie in the same (or almost the same) y-z plane.

While what has been described constitute exemplary embodiments of the invention, it should be recognized that the invention can be varied in numerous ways without departing from the scope thereof. Accordingly, it should be understood that the invention should be limited only insofar as is required by the scope of the following claims.

I claim:

1. A three-dimensional photonic crystal add-drop filter apparatus, comprising:
   a three-dimensional photonic crystal;
   a first waveguide in said three-dimensional photonic crystal for transmitting light having a frequency within a bandgap of said three-dimensional photonic crystal, said first waveguide having an input to and a first output from said three-dimensional photonic crystal;
   a second waveguide in said three-dimensional photonic crystal, said second waveguide having a second output from said three-dimensional photonic crystal; and
   a resonant cavity coupling said first waveguide to said second waveguide for extracting at least one wavelength of the light transmitted in said first waveguide and redirecting the extracted at least one wavelength of the light to said second waveguide to exit said three-dimensional photonic crystal at said second output of said second waveguide, a remainder of the light transmitted in said first waveguide continuing to be transmitted in said first waveguide to exit said three-dimensional photonic crystal at said first output of said first waveguide.

2. The three-dimensional photonic crystal add-drop filter apparatus according to claim 1, wherein said second waveguide is oriented at an angle greater than zero degrees with respect to said first waveguide.

3. The three-dimensional photonic crystal add-drop filter apparatus according to claim 2, wherein said second waveguide is perpendicular to said first waveguide.

4. The three-dimensional photonic crystal add-drop filter apparatus according to claim 1, wherein said second waveguide is in a different plane than said first waveguide.

5. The three-dimensional photonic crystal add-drop filter apparatus according to claim 4, wherein said different planes comprise first and second planes, and wherein said resonant cavity is between said first and second planes.

6. The three-dimensional photonic crystal add-drop filter apparatus according to claim 1, wherein:
   said three-dimensional photonic crystal comprises a plurality of layers arranged one above another, each of the plurality of layers comprising a plurality of elements that are parallel to and spaced from one another, the plurality of elements in each layer arranged at an angle greater than zero degrees with respect to the plurality of elements in an adjacent layer; and wherein said first waveguide comprises a first region of defects in a layer of said plurality of layers extending from said input to said output of said first waveguide, said second waveguide comprises a second region of defects in a layer of said plurality of layers extending to said output of said second waveguide, and said resonant cavity comprises a third region of defects in at least one layer of said plurality of layers.

7. The three-dimensional photonic crystal add-drop filter apparatus according to claim 6, wherein said first and second regions of defects are in different layers of said plurality of layers.

8. The three-dimensional photonic crystal add-drop filter apparatus according to claim 6, wherein said first region of defects is created by omitting an entire element in a first layer of said plurality of layers, and said second region of defects is created by omitting a portion of an element in a second layer of said plurality of layers.

9. The three-dimensional photonic crystal add-drop filter apparatus according to claim 8, wherein said resonant cavity is created by removing a portion of an element in at least one layer of said plurality of layers.

10. The three-dimensional photonic crystal add-drop filter apparatus according to claim 6, wherein said elements comprise dielectric rods.

11. The three-dimensional photonic crystal add-drop filter apparatus according to claim 1, and further including a plurality of resonant cavities, each resonant cavity coupling said first waveguide to a different one of a plurality of second waveguides for extracting light of different at least one wavelengths from said first waveguide and redirecting the extracted light to a different one of said plurality of second waveguides to exit said plurality of second waveguides at outputs of said plurality of second waveguides.

12. An optical communications system, comprising:

a first waveguiding structure for transmitting a plurality of information signals, each of said plurality of information signals being carried by light of a different wavelength;

an extraction device connected to said first waveguiding structure for removing at least one of said plurality of information signals from said first waveguiding structure; and a second waveguiding structure connected to said extraction device for receiving said at least one of said plurality of information signals removed from said first waveguiding structure, wherein said extraction device comprises:

a three-dimensional photonic crystal;

a first waveguide in said three-dimensional photonic crystal for transmitting light having a frequency within a bandgap of said photonic crystal, said first waveguide having an input and an output connected to said first waveguiding structure;

a second waveguide in said photonic crystal having an output connected to said second waveguiding structure; and a resonant cavity coupling said first waveguide to said second waveguide for removing said at least one of the plurality of information signals received by said first waveguide from said first waveguiding structure at said input of said first waveguide and for redirecting the removed at least one of the plurality of information signals to be received by said second waveguiding structure at said output of said second waveguide, a remainder of said plurality of information signals in said first waveguide continuing to be transmitted in said first waveguide to be received by said first waveguiding structure at said output of said first waveguide.

13. The optical communications system according to claim 12, wherein said second waveguide is perpendicular to said first waveguide.

14. The optical communications system according to claim 12, wherein said second waveguide is in a different plane than said first waveguide.

15. The optical communications system according to claim 12, wherein said three-dimensional photonic crystal comprises a plurality of layers arranged one above another, each of the plurality of layers comprising a plurality of elements that are parallel to and spaced from one another, the plurality of elements in each layer arranged at an angle greater than zero with respect to the plurality of elements in an adjacent layer; and wherein said first waveguide comprises a first region of defects in an element in a first layer of said plurality of layers and extending from said input of said first waveguide to said output of said first waveguide, and said second waveguide comprises a second region of defects in a portion of an element in a second layer of said plurality of layers and extending to said output of said second waveguide.

16. The optical communications system according to claim 15, wherein said first region of defects is created by omitting an entire element in said first layer, said second region of defects is created by omitting a portion of an element in said second layer, and said resonant cavity is created by removing a portion of an element in at least one layer of said plurality of layers.

17. The optical communications system according to claim 16, wherein said elements comprise dielectric rods.

18. The optical communications system according to claim 12, and further including a plurality of extraction devices, each extraction device connecting said first waveguiding structure to a different one of a plurality of second waveguiding structures for removing a different at least one of said plurality of information signals from said plurality of information signals in said first waveguiding structure and redirecting the removed at least one of said plurality of information signals to a different one of said plurality of second waveguiding structures.

19. The optical communications system according to claim 12, wherein said system comprises a WDM communications system.

* * * * *